United States Patent
Petty et al.

(10) Patent No.: US 9,675,843 B2
(45) Date of Patent: Jun. 13, 2017

(54) EXTENDABLE ROPE PROTECTING SHEATH

(71) Applicants: David Donald Petty, Cedar City, UT (US); Richard DeMille Petty, Cedar City, UT (US)

(72) Inventors: David Donald Petty, Cedar City, UT (US); Richard DeMille Petty, Cedar City, UT (US)

( * ) Notice: Subject to any disclaimer, the term of this patent is extended or adjusted under 35 U.S.C. 154(b) by 0 days.

(21) Appl. No.: 15/081,806

(22) Filed: Mar. 25, 2016

(65) Prior Publication Data
US 2016/0279477 A1    Sep. 29, 2016

Related U.S. Application Data

(60) Provisional application No. 62/137,933, filed on Mar. 25, 2015.

(51) Int. Cl.
| F16L 57/00 | (2006.01) |
| A63B 29/02 | (2006.01) |
| A63B 29/08 | (2006.01) |
| F16L 57/06 | (2006.01) |
| A63B 71/00 | (2006.01) |

(52) U.S. Cl.
CPC ............ *A63B 29/028* (2013.01); *A63B 29/02* (2013.01); *A63B 29/08* (2013.01); *A63B 2071/009* (2013.01); *A63B 2209/10* (2013.01); *A63B 2210/50* (2013.01); *F16L 57/06* (2013.01)

(58) Field of Classification Search
CPC .. F16L 3/233; H02G 3/0487; B65D 2563/108
USPC ............... 138/110, 167, 118.1, 128, 156; 248/205.2, 68.1
See application file for complete search history.

(56) References Cited

U.S. PATENT DOCUMENTS

| 4,930,543 | A | * | 6/1990 | Zuiches | F16L 35/00 137/375 |
| 5,535,787 | A | * | 7/1996 | Howell | H02G 3/0487 138/110 |
| 5,901,756 | A | * | 5/1999 | Goodrich | F16L 3/233 138/110 |
| 6,102,076 | A | * | 8/2000 | Romero, Jr. | F01N 13/085 138/110 |
| 8,127,405 | B2 | * | 3/2012 | Barger | F16L 3/233 24/16 R |

(Continued)

*Primary Examiner* — Patrick F Brinson

(57) ABSTRACT

An extendable rope protecting sheath is an apparatus that extends over an existing climbing rope in order to provide a barrier that protects said climbing rope from fraying and weakening as a result of direct contact with damaging surfaces. The apparatus includes an extendable sheath which folds over the climbing rope and is secured onto itself by an inner fastening strip and an outer fastening strip. The apparatus includes a first breakaway recovery strap which is connected to the extendable sheath and used to attach a breakaway wristband to the extendable sheath. The attachment between the breakaway wristband and the extendable sheath allows the user to adjust the apparatus with minimal interference to the user's range of motion. The apparatus uses a first double-sided fastening strip and a second double-sided fastening strip to secure the apparatus to the climbing rope and link multiple extendable rope protecting sheaths together.

15 Claims, 8 Drawing Sheets

(56) References Cited

U.S. PATENT DOCUMENTS

| | | | | |
|---|---|---|---|---|
| 8,205,314 | B1* | 6/2012 | Dermody, IV | B21D 49/00 29/428 |
| 8,691,036 | B2* | 4/2014 | Barger | F16L 3/233 156/227 |
| 8,752,590 | B2* | 6/2014 | Petty | A63B 29/02 138/107 |
| 2002/0170727 | A1* | 11/2002 | Holland | H02G 15/18 174/19 |
| 2002/0170728 | A1* | 11/2002 | Holland | B65D 63/00 174/19 |
| 2011/0091682 | A1* | 4/2011 | Holland | B32B 5/26 428/100 |

* cited by examiner

EXTENDABLE ROPE PROTECTING SHEATH

The current application claims a priority to the U.S. Provisional Patent application Ser. No. 62/137,933 filed on Mar. 25, 2015.

FIELD OF THE INVENTION

The present invention relates generally to a rock climbing accessory, more specifically, to a rope protecting sheath that extends over the length of a climbing rope during use in order to prevent abrasive surfaces such as rocks, branches, and debris from fraying or weakening the climbing rope.

BACKGROUND OF THE INVENTION

Rock climbing is an activity that is both mentally and physically demanding. Climbers compete with themselves and their environment to reach the summits of a formation or other predefined goals. The sport tests a climber's endurance, agility, and strength while providing an element of danger, which although minimal if executed properly, requires the climber to exercise mental control to ensure completion of their goal. Once a climber reaches the summit or their set goal they can begin a controlled descent down the same rock face.

A controlled descent, commonly referred to as abseiling or rappelling, is a technique used to descend down a mountain face, cliff, or slope that may pose a danger to the climber or individual if they attempt to descend the area without protective equipment. Abseiling or rappelling is commonly used in a variety of situations that include but are not limited to, climbing, canyoneering, caving, and rescue operations. The basic equipment for rappelling includes a climbing or rappelling rope, an anchor, a rappelling device, and a climbing harness. The climber is able to control their rappel by having their rope attached to an anchoring point and using a rappelling device to apply friction to the rope as they move down a surface. Unfortunately, the rappelling device is not the only thing that can cause friction to a climber's rope. The surface a climber is descending can have a plurality of rough or sharp points of contact that can potentially damage the climber's rope. These rough or sharp points of contact can damage the rope and potentially create a life threatening situation for the climber.

It is therefore the object of the present invention to provide an apparatus that extends over an existing climbing rope providing a barrier that protects the climbing rope from fraying and weakening as a result of direct contact with damaging surfaces. One existing method of protecting a climbing rope involves wrapping and adhering a protective cover over sections of the climbing rope. While this effectively protects a portion of the climbing rope, this solution cannot easily be adjusted during a descent. Another existing option includes the use of a sleeve which slides over a rope and may be secured in place. This option is more versatile; however, sliding the sleeve over great lengths of rope can become a hassle and lead to tangling the rope. Further, this solution is limited by the maximum length of the sleeve.

Accordingly, there is a present need for an apparatus which can easily be secured about a climbing rope and adjusted during a descent. The apparatus utilizes an extendable sheath that may be easily folded over a climbing rope to protect the climbing rope from wear. The apparatus extends over the length of the climbing rope from a compressed state as the climber makes a descent. This allows the user to selectively adjust which portion of the climbing rope is protected. The apparatus uses a first double-sided fastening strip and a second double-sided fastening strip to secure the extendable sheath to the climbing rope. The first double-sided fastening strip and the second double-sided fastening strip are also used to attach multiple extendable sheaths in tandem along a climbing rope.

DETAILED DESCRIPTION OF THE INVENTION

All illustrations of the drawings are for the purpose of describing selected versions of the present invention and are not intended to limit the scope of the present invention.

Figure 1:
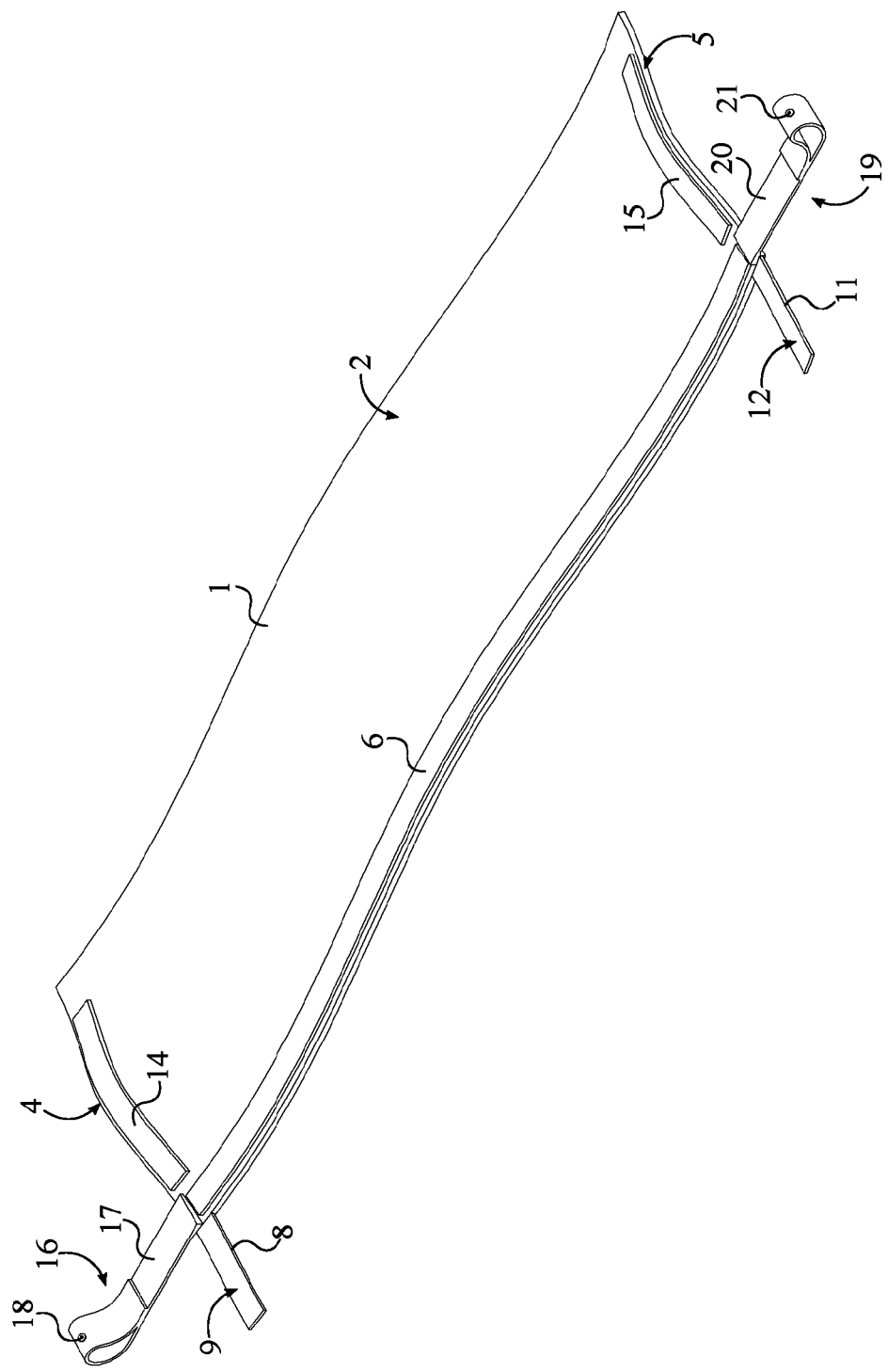
FIG. 1 is a top perspective view of the present invention.
Figure 2:
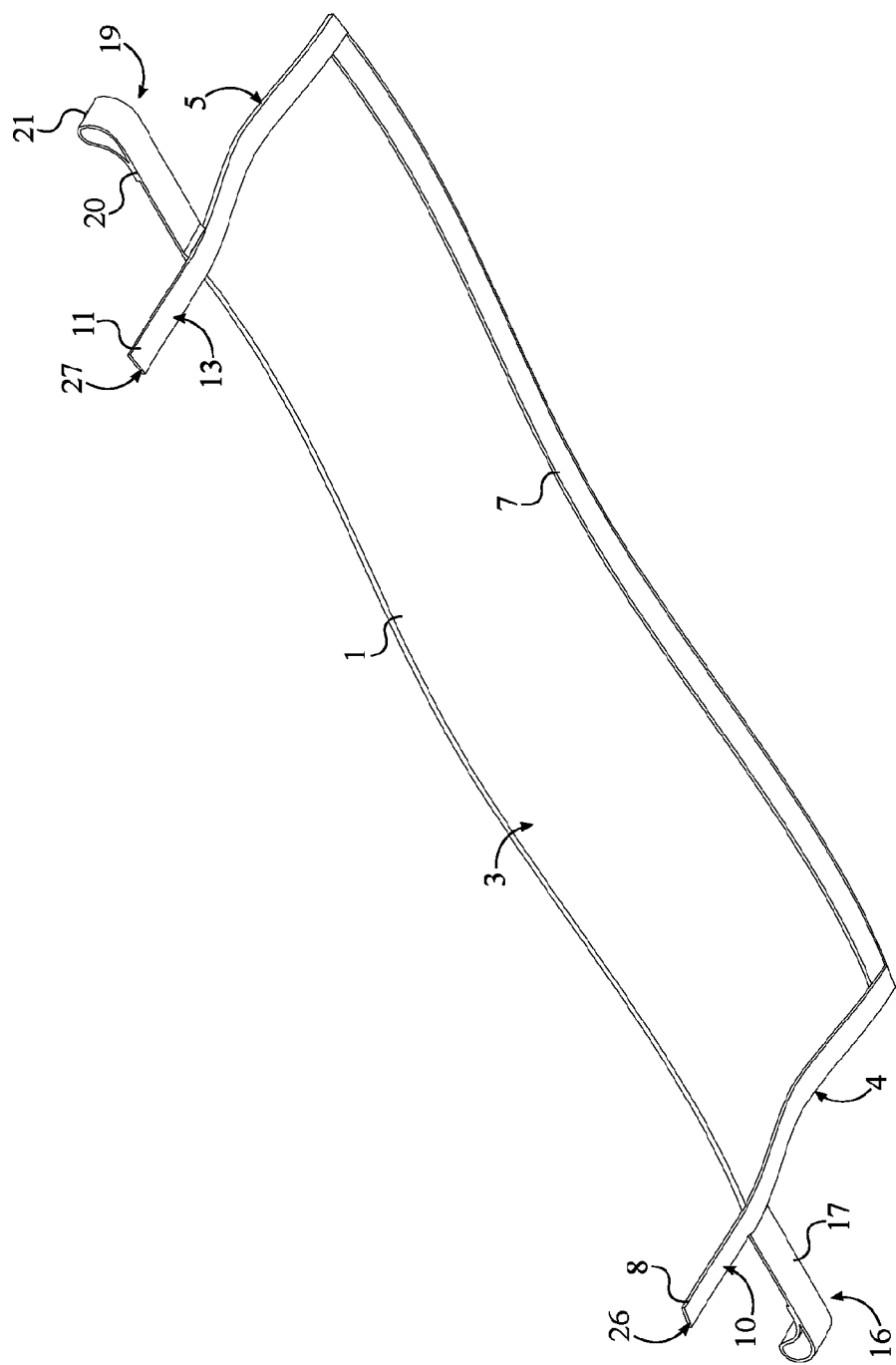
FIG. 2 is a bottom perspective view of the present invention.

With reference to FIGS. 1-2, the present invention is an extendable rope protecting sheath which extends over an existing climbing rope and protects the climbing rope from fraying or weakening as a result of direct contact with damaging surfaces. The extendable rope protecting sheath comprises an extendable sheath 1, an inner fastening strip 6, an outer fastening strip 7, and a first breakaway recovery strap 16. The extendable sheath 1 is a barrier that surrounds a climbing rope, protecting the climbing rope from direct contact with a damaging surface. The extendable sheath 1 comprises an inner surface 2, an outer surface 3, a first end 4, and a second end 5. The first end 4 and the second end 5 are positioned opposite to each other along the extendable sheath 1. The first end 4 and the second end 5 delineate the length of rope in which the extendable sheath 1 is able to protect. The inner surface 2 and the outer surface 3 are positioned opposite to each other about the extendable sheath 1. During use, the inner surface 2 encircles the climbing rope, while the outer surface 3 contacts a surface which could otherwise damage the climbing rope.

In reference to FIG. 1, the inner fastening strip 6 is connected along the inner surface 2 from the first end 4 to the second end 5. The outer fastening strip 7 is connected along the outer surface 3 from the first end 4 to the second end 5. The inner fastening strip 6 and the outer fastening strip 7 are designed to engage with each other. In the preferred embodiment, the inner fastening strip 6 and the outer fastening strip 7 form a hook and loop fastener with the inner fastening strip 6 being the loop portion and the outer fastening strip 7 being the hook portion. However, in alternative embodiments of the present invention, this configuration may be swapped. The inner fastening strip 6 and the outer fastening strip 7 are positioned opposite to each other across the extendable sheath 1. This allows the extendable sheath 1 to be folded and fastened to itself by the inner fastening strip 6 and the outer fastening strip 7.

The present invention is designed such that multiple extendable rope protecting sheaths may be attached together to form a single, larger, extendable rope protecting sheath. This is done by engaging the inner fastening strip 6 of a first extendable rope protecting sheath with the outer fastening strip 7 of a second extendable rope protecting sheath. The second extendable rope protecting sheath may then be folded over so that the inner fastening strip 6 of the second extendable rope protecting sheath may be engaged to the outer fastening strip 7 of the first extendable rope protecting sheath. This arrangement is useful for protecting ropes with relatively large diameters, as well as large quantities of ropes. It is to be understood that more than two extendable rope protecting sheaths may be attached by following the same technique.

Figure 5:
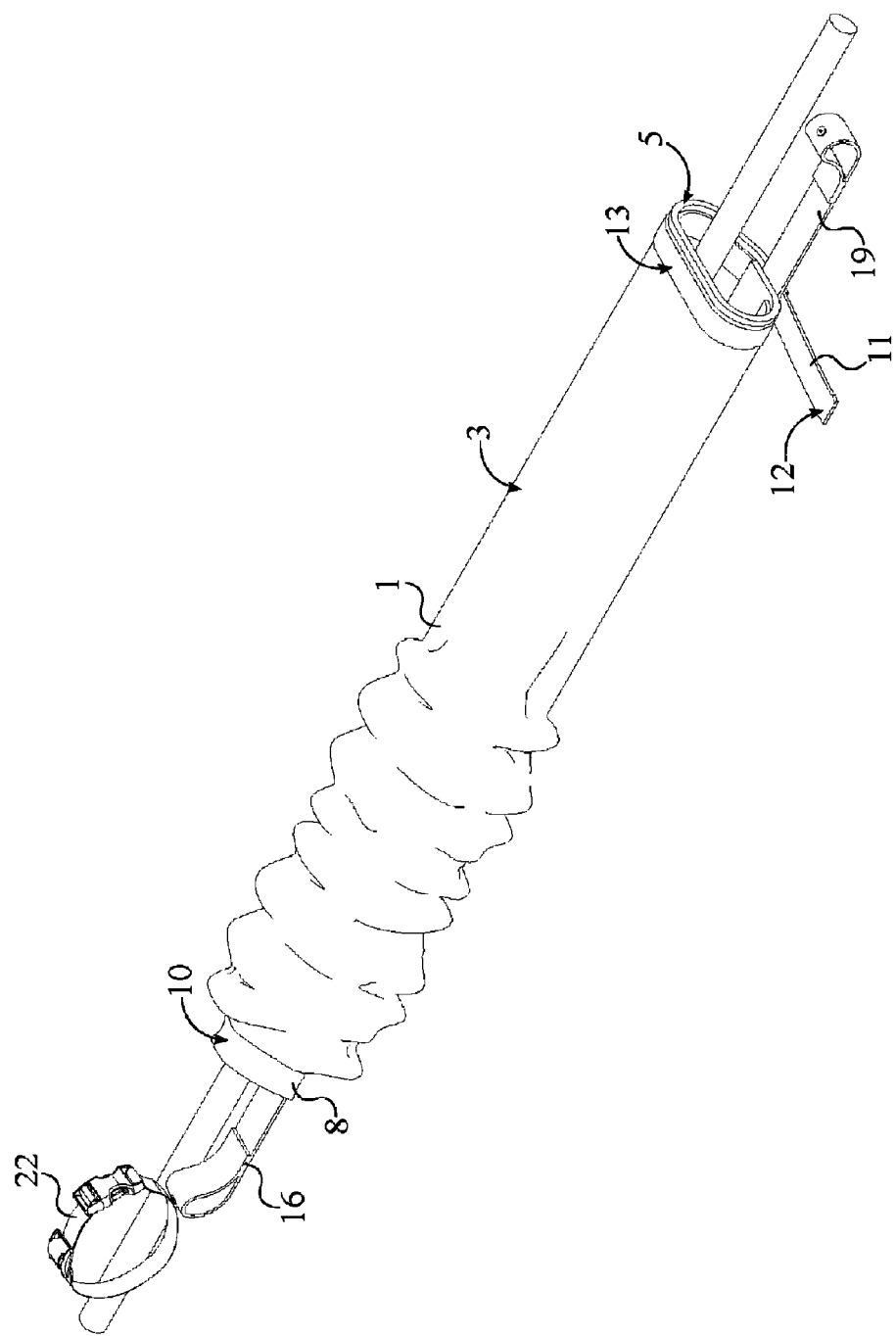
FIG. 5 is a top perspective view of the present invention, wherein the extendable sheath is in the folded configuration and the extendable sheath is partially retracted.

In reference to FIG. 1 and FIG. 5, the first breakaway recovery strap 16 is used to attach the extendable sleeve to a wristband, harness, or a similar article. The first breakaway recovery strap 16 is connected to the extendable sheath 1, adjacent to the first end 4. This arrangement allows the user to adjust the position of the extendable sheath 1 during their decent by effectively pulling on the first end 4.

In reference to FIGS. 1-2, the present invention further comprises a first double-sided fastening strip 8. The first double-sided fastening strip 8 comprises a first loop surface 9 and a first hook surface 10. The first double-sided fastening strip 8 is connected adjacent to the first end 4 and is used to tighten the first end 4 around a climbing rope. This functionality is useful to prevent the extendable sheath 1 from sliding along the climbing rope during the user's descent. The first double-sided fastening strip 8 is oriented perpendicular to the inner fastening strip 6, allowing the first double-sided fastening strip 8 to be wrapped about the extendable sheath 1. Similar to the inner fastening strip 6 and the outer fastening strip 7, the first loop surface 9 and the first hook surface 10 are designed to engage with each other. This is shown in FIG. 5. The first loop surface 9 and the first hook surface 10 are positioned opposite to each other about the first double-sided fastening strip 8. The first loop surface 9 extends from a free end 26 of the first double-sided fastening strip 8 to the extendable sheath 1. The first hook surface 10 extends from the free end 26 of the first double-sided fastening strip 8 to the outer fastening strip 7. This arrangement allows the first loop surface 9 to overlap and engage with the first hook surface 10 when the first double-sided fastening strip 8 is wrapped around first end 4.

Figure 6:
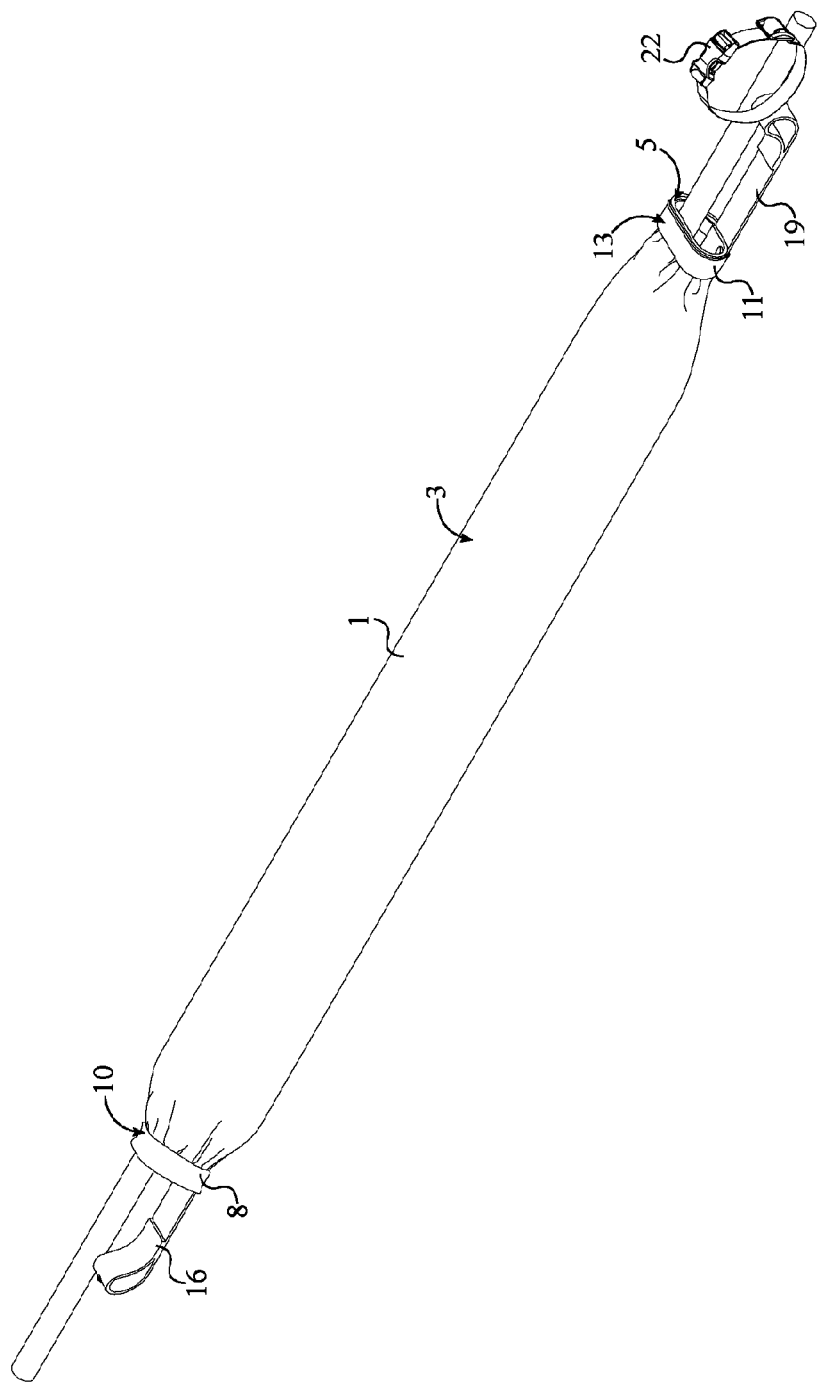
FIG. 6 is a top perspective view of the present invention, wherein the extendable sheath is in the folded configuration and the extendable sheath is fully extended.

In reference to FIGS. 1-2, the present invention further comprises a second double-sided fastening strip 11. Similar to the first double-sided fastening strip 8, the second double-sided fastening strip 11 comprises a second loop surface 12 and a second hook surface 13. The second double-sided fastening strip 11 is connected adjacent to the second end 5 and is used to tighten the second end 5 around a climbing rope. This functionality may be used to further prevent the extendable sheath 1 from sliding along the climbing rope during the user's descent. The second double-sided fastening strip 11 is oriented perpendicular to the inner fastening strip 6, allowing the second double-sided fastening strip 11 to be wrapped about the extendable sheath 1. This is shown in FIG. 6. The second loop surface 12 and the second hook surface 13 are positioned opposite to each other about the second double-sided fastening strip 11. The second loop surface 12 extends from a free end 27 of the second double-sided fastening strip 11 to the extendable sheath 1. The second hook surface 13 extends from the free end 27 of the second double-sided fastening strip 11 to the outer fastening strip 7. This arrangement allows the second loop surface 12 to overlap and engage with the second hook surface 13 when the second double-sided fastening strip 11 is wrapped around second end 5.

Figure 3:
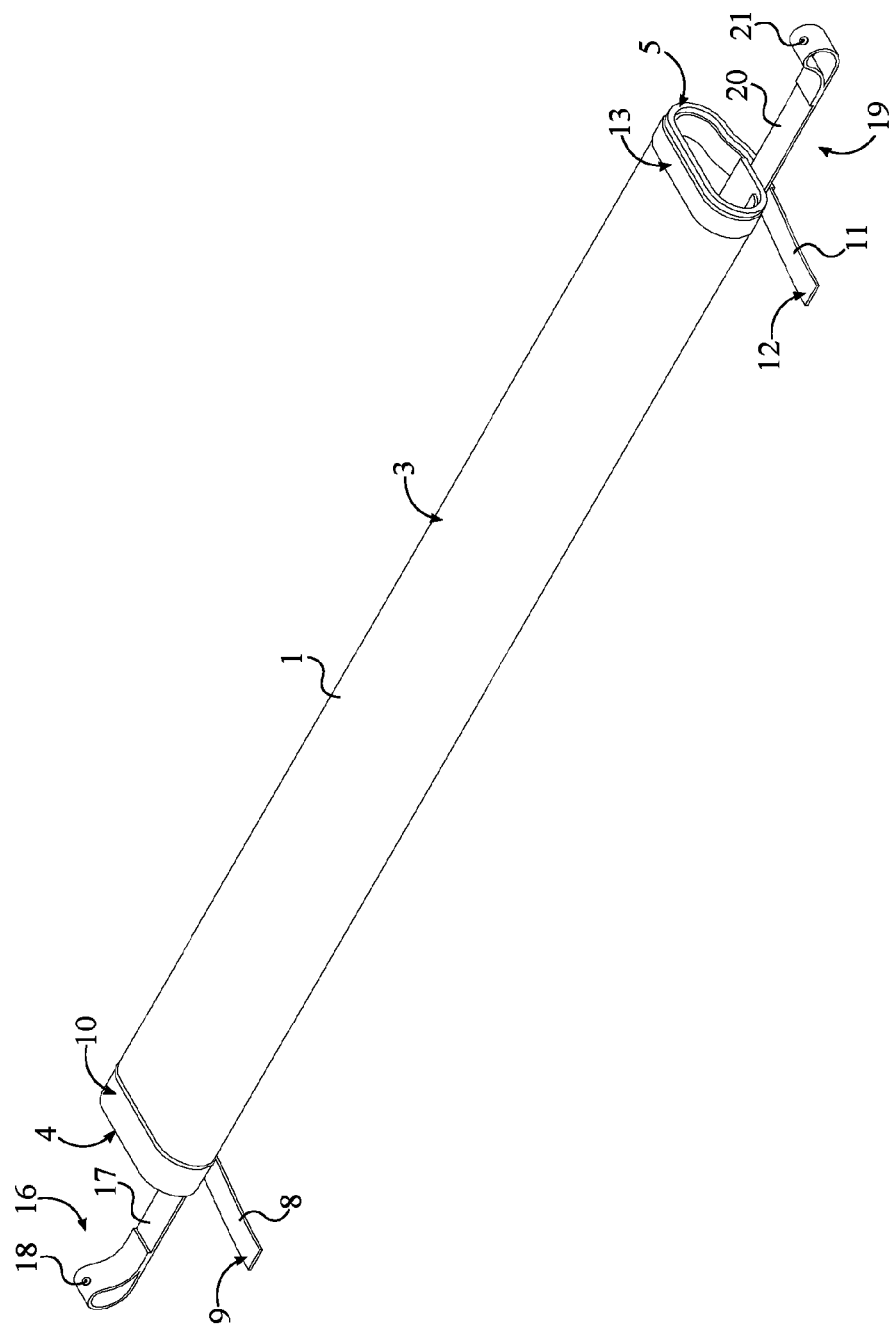
FIG. 3 is a top perspective view of the present invention, wherein the extendable sheath is in the folded configuration, characterized by the inner surface being encircled by the outer surface.
Figure 4:
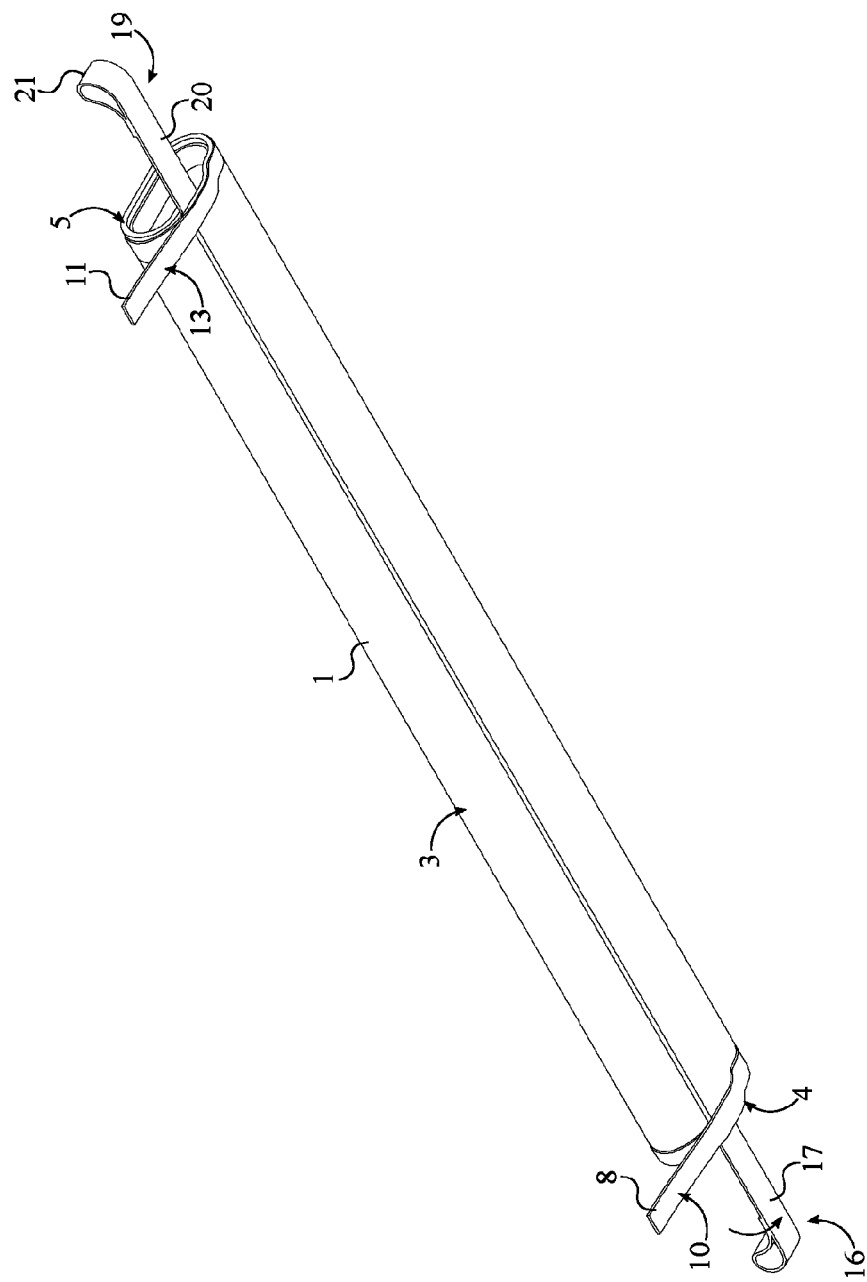
FIG. 4 is a bottom perspective view of the present invention, wherein the extendable sheath is in the folded configuration.

In order to form a folded configuration with the extendable sheath 1, the inner surface 2 is encircled by the outer surface 3 and the inner fastening strip 6 is engaged with the outer fastening strip 7. This is shown in FIGS. 3-4. The folded configuration of the extendable sheath 1 allows the extendable sheath 1 to fully encircle the climbing rope, protecting the climbing rope from wear against damaging surfaces. In order to tighten the first end 4 of the extendable sheath 1, the first loop surface 9 is tethered around the outer surface 3 and the first hook surface 10 is engaged with the first loop surface 9. Similarly, in order to tighten the second end 5 of the extendable sheath 1, the second loop surface 12 is tethered around the outer surface 3 and the second hook surface 13 is engaged with the second loop surface 12.

In reference to FIG. 1, the present invention further comprises a first linking strip 14. The first linking strip 14 is connected adjacent to the inner surface 2 and is used to attach the extendable rope protecting sheath to another extendable rope protecting sheaths together in tandem. This is done to protect a greater length of the climbing rope from wear. The first linking strip 14 is positioned adjacent to the first end 4 and is oriented perpendicular to the inner fastening strip 6. This arrangement allows the first end 4 of the extendable sheath 1 to be attached about another extendable rope protecting sheath.

Similarly, the present invention further comprises a second linking strip 15. In reference to FIG. 1, the second linking strip 15 is connected adjacent to the inner surface 2 and is used to attach the extendable rope protecting sheath to another extendable rope protecting sheaths together in tandem. This is done to protect a greater length of the climbing rope from wear. The second linking strip 15 is positioned adjacent to the second end 5 and is oriented perpendicular to the inner fastening strip 6. This arrangement allows the second end 5 of the extendable sheath 1 to be attached about another extendable rope protecting sheath.

If, for example, the user wished to attach the second end 5 of a second extendable rope protecting sheath about the first end 4 of a first extendable rope protecting sheath, the second linking strip 15 of the second extendable rope protecting sheath would engage with the first hook surface 10 for the first double-sided fastening strip 8 of the first extendable rope protecting sheath. The first double-sided fastening strip 8 and the second double-sided fastening strip 11 are designed to both engage with any hook surface. This allows the user to attach multiple extendable rope protecting sheaths in various arrangements.

In reference to FIG. 1 and FIG. 5, the first breakaway recovery strap 16 comprises a first strap body 17 and a first recovery snap buckle 18. The first strap body 17 is connected adjacent to the first end 4 and is used to provide a link between the user and the extendable sheath 1. The first recovery snap buckle 18 is used to attach a wristband or similar article to the first recovery snap buckle 18. The first recovery snap buckle 18 is laterally connected to the first strap body 17, opposite to the extendable sheath 1. Because the first recovery snap buckle 18 is offset from the extendable sheath 1, the user is able to move freely without interference from the extendable sheath 1.

Similarly, the present invention further comprises a second breakaway recovery strap 19. In reference to FIG. 1, the second breakaway recovery strap 19 is used to attach the extendable sleeve to a wristband, harness, or a similar article. The second breakaway recovery strap 19 comprises a second strap body 20 and a second recovery snap buckle 21. The second strap body 20 is connected adjacent to the second end 5 and is used to provide a link between the user and the extendable sheath 1. The second recovery snap buckle 21 is used to attach a wristband or similar article to the second recovery snap buckle 21. The second recovery snap buckle 21 is laterally connected to the second strap body 20, opposite to the extendable sheath 1. Because the second recovery snap buckle 21 is offset from the extendable sheath 1, the user is able to move freely without interference from the extendable sheath 1.

Figure 7:
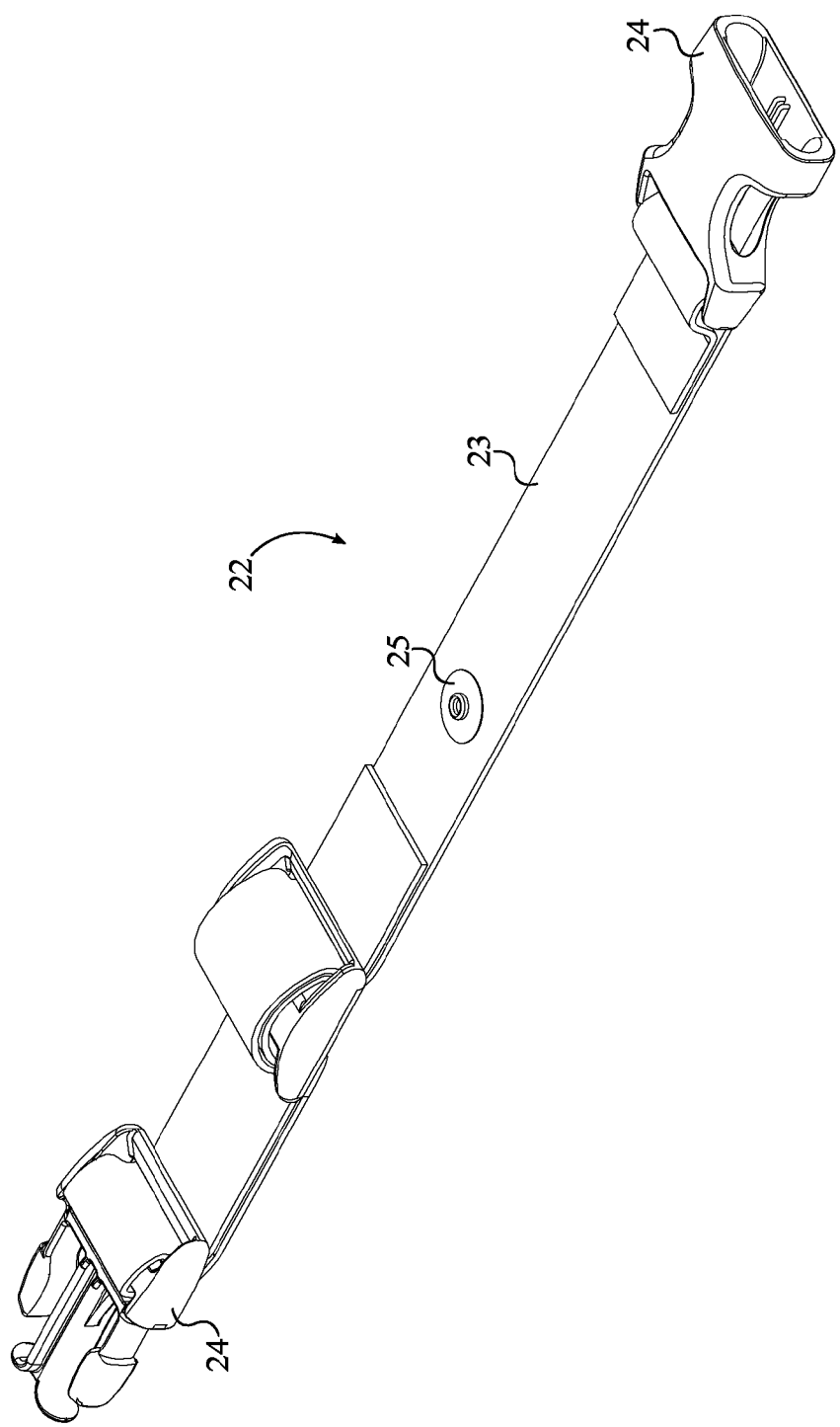
FIG. 7 is a top perspective view of the breakaway wristband in the open configuration, wherein the strap fastener is not fastened in the open configuration.
Figure 8:
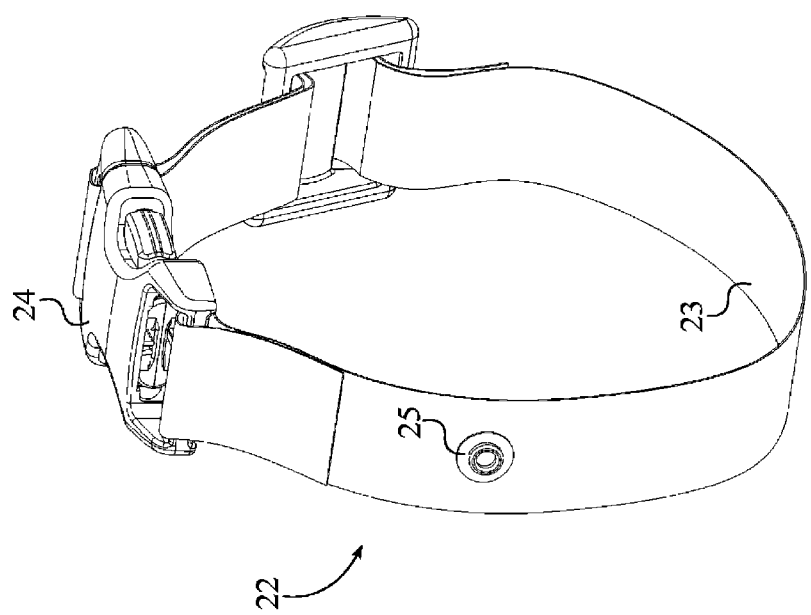
FIG. 8 is a top perspective view of the breakaway wristband in the closed configuration, wherein the strap fastener is fastened in the closed configuration.

In reference to FIGS. 7-8. the present invention further comprises a breakaway wristband 22. The breakaway wristband 22 functions as an attachment point between the user and the extendable sheath 1. The breakaway wristband 22 provides the user with a means of extending the extendable sheath 1 over portions of the climbing rope, while leaving both hands free during a descent. The breakaway wristband 22 comprises an adjustable band 23, a strap fastener 24, and a band snap buckle 25. The adjustable band 23 is the strap portion of the breakaway wristband 22 that is secured around the user's wrist. The strap fastener 24 is the coupler that secures and adjusts the adjustable band 23 to the user's wrist. The adjustable band 23 is detachably looped by the strap fastener 24. This allows the breakaway wristband 22 to easily be attached to or removed from the user's wrist. The band snap buckle 25 is peripherally positioned on the adjustable band 23 and is used to couple the breakaway wristband 22 to either the first breakaway recovery strap 16 or the second breakaway recovery strap 19. In the preferred embodiment of the present invention, the band snap buckle 25 is detachably engaged with the first recovery snap buckle 18 of the first breakaway recovery strap 16. This allows the user to extend the extendable sheath 1 until the climbing rope is properly protected. Then, the user is able to detach from the first breakaway recovery strap 16 and continue with their descent. The detachable engagement between the breakaway wristband 22 and the first breakaway recovery strap 16 is provided as a low jerk detachable engagement. This prevents sudden changes in resistance between the breakaway wristband 22 and the first breakaway recovery strap 16.

Similarly, in an alternative embodiment of the present invention, the band snap buckle 25 may be detachably engaged with the second recovery snap buckle 21 of the second breakaway recovery strap 19. This is shown in FIG. 6. This allows the user to extend the extendable sheath 1 until the climbing rope is properly protected. Then, the user is able to detach from the second breakaway recovery strap 19 and continue with their descent. The detachable engagement between the breakaway wristband 22 and the second breakaway recovery strap 19 is provided as a low jerk detachable engagement. This prevents sudden changes in resistance between the breakaway wristband 22 and the second breakaway recovery strap 19. The use of a first breakaway recovery strap 16 and a second breakaway recovery strap 19 provides greater versatility for the user to take advantage of when making a descent.

Although the invention has been explained in relation to its preferred embodiment, it is to be understood that many other possible modifications and variations can be made without departing from the spirit and scope of the invention as hereinafter claimed.

What is claimed is:

1. An extendable rope protecting sheath comprises:
    an extendable sheath;
    an inner fastening strip;
    an outer fastening strip;
    a first breakaway recovery strap;
    the extendable sheath comprises an inner surface, an outer surface, a first end, and a second end;
    the first end and the second end being positioned opposite to each other along the extendable sheath;
    the inner fastening strip being connected along the inner surface from the first end to the second end;
    the outer fastening strip being connected along the outer surface from the first end to the second end;
    the inner fastening strip and the outer fastening strip being positioned opposite to each other across the extendable sheath;
    the first breakaway recovery strap being connected to the extendable sheath, adjacent to the first end;
    a first linking strip;
    the first linking strip being connected adjacent to the inner surface;
    the first linking strip being positioned adjacent to the first end; and
    the first linking strip being oriented perpendicular to inner fastening strip.

2. The extendable rope protecting sheath as claimed in claim 1, wherein the inner surface and the outer surface are positioned opposite to each other about the extendable sheath.

3. The extendable rope protecting sheath as claimed in claim 1 comprises:
    a first double-sided fastening strip;
    the first double-sided fastening strip comprises a first loop surface, and a first hook surface;
    the first double-sided fastening strip being connected adjacent to the first end;
    the first double-sided fastening strip being oriented perpendicular to the inner fastening strip; and
    the first loop surface and the first hook surface being positioned opposite to each other about the first double-sided fastening strip.

4. The extendable rope protecting sheath as claimed in claim 3 comprises:
    the first loop surface being extended from a free end of the first double-sided fastening strip to the extendable sheath; and
    the first hook surface being extended from the free end of the first double-sided fastening strip to the outer fastening strip.

5. The extendable rope protecting sheath as claimed in claim 3 comprises:
    the inner surface being encircled by the outer surface;
    the inner fastening strip being engaged with the outer fastening strip, wherein the extendable sheath forms a folded configuration;
    the first loop surface being tethered around the outer surface; and
    the first hook surface being engaged with the first loop surface.

6. The extendable rope protecting sheath as claimed in claim 1 comprises:

a second double-sided fastening strip;
the second double-sided fastening strip comprises a second loop surface, and a second hook surface;
the second double-sided fastening strip being connected adjacent to the second end;
the second double-sided fastening strip being oriented perpendicular to the inner fastening strip; and
the loop surface and the hook surface being positioned opposite to each other about the second double-sided fastening strip.

7. The extendable rope protecting sheath as claimed in claim 6 comprises:
the second loop surface being extended from a free end of the second double-sided fastening strip to the extendable sheath; and
the second hook surface being extended from the free end of the second double-sided fastening strip to the outer fastening strip.

8. The extendable rope protecting sheath as claimed in claim 6 comprises:
the inner surface being encircled by the outer surface;
the inner fastening strip being engaged with the outer fastening strip, wherein the extendable sheath forms a folded configuration;
the second loop surface being tethered around the outer surface; and
the second hook surface being engaged with the second loop surface.

9. The extendable rope protecting sheath as claimed in claim 1 comprises:
a second linking strip;
the second linking strip being connected adjacent to the inner surface;
the second linking strip being positioned adjacent to the second end; and
the second linking strip being oriented perpendicular to inner fastening strip.

10. The extendable rope protecting sheath as claimed in claim 1 comprises:
the first breakaway recovery strap comprises a first strap body and a first recovery snap buckle;
the first strap body being connected adjacent to the first end; and
the first recovery snap buckle being laterally connected to the first strap body, opposite to the extendable sheath.

11. The extendable rope protecting sheath as claimed in claim 1 comprises:
a second breakaway recovery strap;
the second breakaway recovery strap comprises a second strap body and a second recovery snap buckle;
the second strap body being connected adjacent to the second end; and
the second recovery snap buckle being laterally connected to the second strap body, opposite to the extendable sheath.

12. The extendable rope protecting sheath as claimed in claim 1 comprises:
a breakaway wristband;
the breakaway wristband comprises an adjustable band, a strap fastener, and a band snap buckle;
the adjustable band being detachably looped by the strap fastener;
the band snap buckle being peripherally positioned on the adjustable band; and
the band snap buckle being detachably engaged with a first recovery snap buckle of the first breakaway recovery strap.

13. The extendable rope protecting sheath as claimed in claim 12, wherein the detachable engagement between the breakaway wristband and the first breakaway recovery strap is provided as a low jerk detachable engagement.

14. The extendable rope protecting sheath as claimed in claim 1 comprises:
a breakaway wristband;
the breakaway wristband comprises an adjustable band, a strap fastener, and a band snap buckle;
the adjustable band being detachably looped by the strap fastener;
the band snap buckle being peripherally positioned on the adjustable band; and
the band snap buckle being detachably engaged with a second recovery snap buckle of the second breakaway recovery strap.

15. The extendable rope protecting sheath as claimed in claim 14, wherein the detachable engagement between the breakaway wristband and the first breakaway recovery strap is provided as a low jerk detachable engagement.

* * * * *